March 31, 1970 — N. R. DIBELIUS — 3,503,850
BLOOD OXYGENATOR
Filed Nov. 29, 1967

Inventor:
Norman R. Dibelius,
by Leo S. Massei
His Attorney.

United States Patent Office 3,503,850
Patented Mar. 31, 1970

3,503,850
BLOOD OXYGENATOR
Norman R. Dibelius, Ballston Spa, N.Y., assignor to General Electric Company, a corporation of New York
Filed Nov. 29, 1967, Ser. No. 686,432
Int. Cl. A61m 1/03; C12k 9/00
U.S. Cl. 195—1.8                          3 Claims

ABSTRACT OF THE DISCLOSURE

Blood oxygenator of the membrane type including an electrically-conductive foraminous spacer in the flow path on the blood side of the membrane. Means are provided for imposing a negative electrical potential on the foraminous spacer for the purposes of reducing damage to the red blood cells.

BACKGROUND OF THE INVENTION

The use of thin, non-porous polymer membranes for the separation of gases by the permeation phenomena is broadly known. Also, the diffusion of oxygen through such a membrane into a flowing stream of blood to effect oxygenation thereof and, at the same time, to permit the diffusion of carbon dioxide out of the blood through the permselective membrane is, for example, disclosed in U.S. Patent No. 3,015,331—Warrick.

Usually the process of oxygenation is carried out by continuously flowing a stream of either pure oxygen or a mixture of gases containing oxygen in contact with one side of the non-porous permeable membrane, while simultaneously directing a flow of blood over the opposite side of the same membrane. Also, gas exchange apparatuses of the cross-flow and counter-flow types, which could be used for this purpose, are known.

It has been found to be of particular advantage to achieve the gas exchange by conducting the flow of blood through a channel having a high area-to-volume ratio using parallel membranes spaced close to each other and held apart with some foraminous spacing member. However, in the process of conducting a flow of blood through a blood oxygenator, it has been found that the red blood cells are subjected to an objectionable amount of damage as they come into contact with the spacing devices, such as screens. When such damage occurs, clotting of these cells is initiated. The resulting clots in addition to reducing the number of blood cells available to the patient and, thereby contributing to patient anemia present two additional problems. Such clots either tend to clog the spacing members or, if they are not so removed from the blood stream, pass through the blood oxygenator and back into the patient's body, where complications may result.

There is a definite need for improvement in blood oxygenator construction so as to minimize or obviate the aforementioned damage to the red blood cells and the problems precipitated thereby and the instant invention fulfills this need.

SUMMARY OF THE INVENTION

The basic blood oxygenator construction for which this invention provides an improvement typically consists of a stacked array of imperforate membrane sheets alternating with porous separator, or spacer, members between fixed walls to define a plurality of passageways arranged into two separate sets with appropriate manifolding. The usual separator members, which dispose the membranes in parallel relationship to each other are usually woven screens. In the gas passages, such screen serve not only to define the flow passages, but also to create a certain amount of turbulence, which prevents the buildup of a boundary layer of gas immediately adjacent the membrane surface.

The improvement of the instant invention provides for the imposition of a negative potential to each blood passage screen, whereby the red blood cells in the flowing stream are repelled from the blood passage screen reducing the contact therebetween during transit of the blood through the blood passage.

BRIEF DESCRIPTION OF THE DRAWING

Other objects, features and advantages of the invention will appear more clearly from the following detailed description of the preferred embodiment thereof made with reference to the drawings in which.

DESCRIPTION OF THE PREFERRED EMBODIMENT

Figure 1:
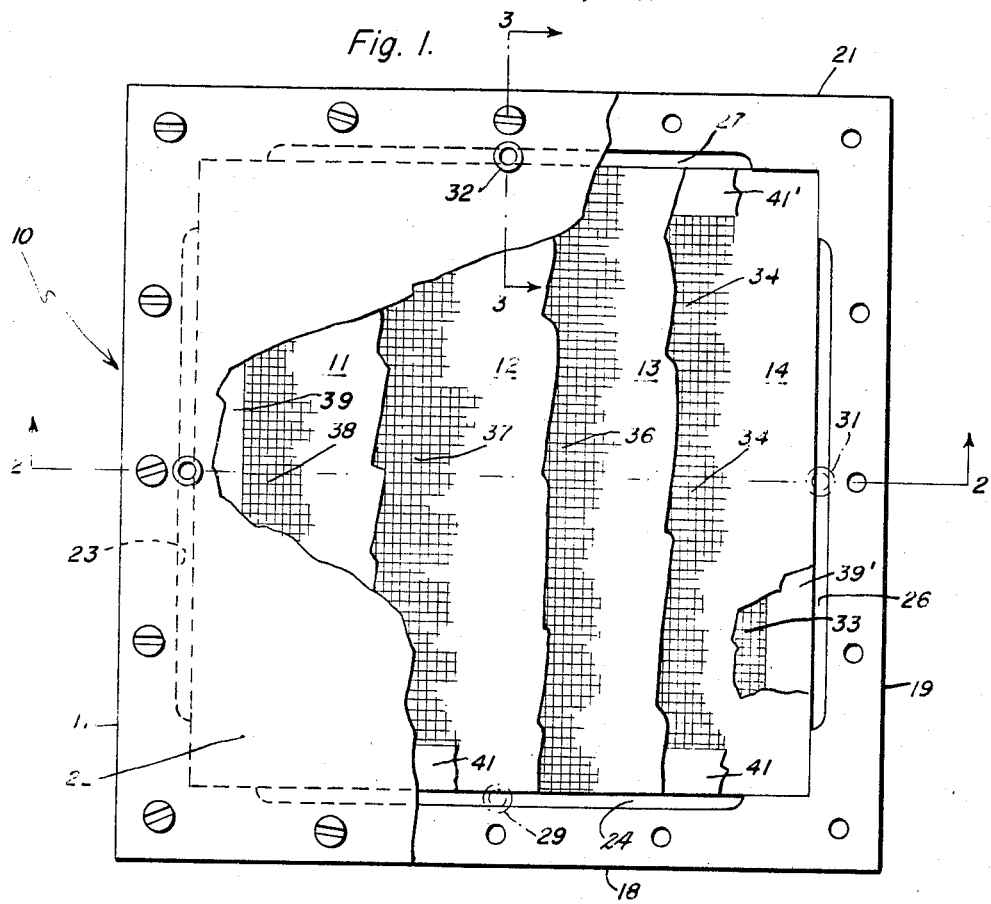
FIG. 1 is a plane view of a cross-flow blood oxygenator to which the improvement of this invention may be applied.

Referring now to FIG. 1, a cross-flow blood oxygenator 10 is shown having a plurality of selectively permeable membranes 11, 12, 13, 14 enclosed within a housing comprising a bottom 16, side walls 17, 18, 19 and 21 and top 22.

Figure 2:
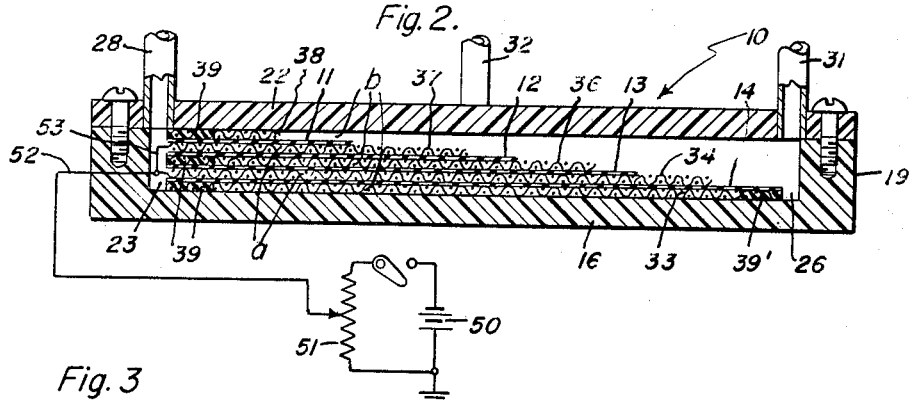
FIG. 2 is a cross sectional view taken along line 2—2 of FIG. 1.
Figure 3:
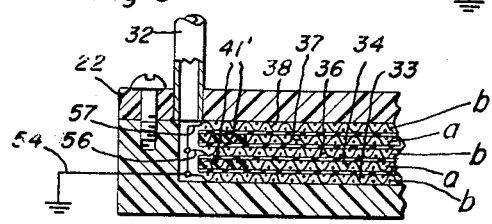
FIG. 3 is a fragmentary cross sectional view taken along line 3—3 of FIG. 1 and together with FIG. 2 schematically illustrates the electrical connections and apparatus required in the practice of this invention.

Side wall members 17 through 21 are provided with recesses 23, 24, 26, 27, respectively, functioning as separate manifolds. As may be seen in FIGS. 2 and 3, the recesses 23, 24, 26 and 27 all extend for the full depth of the enclosed volume. Conduits 28, 29, 31 and 32 extend through top 22 as shown to communicate with manifolds 23, 24, 26 and 27, respectively, for the interchange of fluids therewith.

The membranes 11, 12, 13 and 14 are held in substantially parallel relationship by the screens 33, 34, 36, 37 and 38 defining the sets of passageways indicated as passageways $a$ and passagesways $b$. Further definition of passageways $a$ and $b$ is afforded by seals 39, 39' and 41, 41' as may be seen in FIGS. 2 and 3. Thus, manifolds 23 and 26 communicate with the set of passageways $a$ while the manifolds 24 and 27 communicate with the set of passageways $b$.

In operation, blood is admitted to passageways $a$ via conduit 28 and manifold 23. The blood flow exits from passageways $a$ via manifold 26 and conduit 31. At the same time, the oxygenating gas is caused to flow through passageways $b$ from conduit 29 and manifold 24. The gas flow exits from passageways $b$ via manifold 27 and conduit 32. Preferably, two edges of each of screens 33, 36 and 38 are embedded in seals 39, 39' and two edges of each of screens 34, 37 are embedded in seals 41, 41' for ease of manufacture. All seals must, of course, be fluid-tight.

To the extent described hereinabove, the cross-flow oxygenator is substantially of the same construction as the gas exchange apparatus described in U.S. patent application Ser. No. 432,195—Dibelius et al., filed Feb. 12, 1965 (now abandoned) and assigned to the assignee of the instant application.

The improvement of this invention adds to the prior construction means for the controlled application of a difference in electrical potential causing the metal screens 34 and 37 (one in each of passageways $a$, the blood flow passages) to have a negative potential and, for this reason, to repel red blood cells in the flow stream passing therethrough thereby reducing damage to these blood cells. Means for applying the preselected difference in electric potential between metal screens 34, 37, on the one hand, and metal screens 33, 36 and 38, on the other, are shown schematically in FIGS. 2 and 3 and comprise a source of electric potential 50 connected to the screens as shown via potentiometer 51. Thus, the source 50 of electric potential is shown as a battery (1.5 volts) having the negative terminal thereof connected by wires 52 and 53 to screens 34 and 37, respectively, and having the positive terminal connected to a common ground with the common connection from wires 54, 56 and 57, which are in turn connected to screens 33, 36 and 38, respectively. Potentiometer 51 is adjusted to apply a negative potential of about −16.8 millivolts to the separator elements in the blood flow passages. The particular value of negative potential selected is equal to the recognized negative potential of human red blood cells in order to provide maximum repulsion thereof [Sawyer, P. N., J. W. Pate and C. S. Weldon, Relations of Abnormal and Injury Electric Potential Differences to Intravascular Thrombosis, Amer. J. Physiol., 175, 108 (1953)].

In one specific embodiment of this apparatus the selectively permeable membranes would be of silicone rubber approximately 1 mil or less in thickness preferably prepared by the method described in U.S. Patent 3,325,330—Robb. Other conventional selectively electrically non-conducting permeable membrane materials may, of course, be employed, if desired. The housing is preferably made of an electrically insulating material, such as a plastic. However, a non-insulator may be used and the electrically conducting components insulated therefrom. The preferred screen material is stainless steel, although other conducting metals, such as silver, nickel and platinum may be employed. One or more of these same metals would be used for the electrical conductors or for portions thereof extending into the housing.

Although only one suitable arrangement is shown for applying the requisite negative potential to screens 52 and 53 equally suitable variants are well known in the electrical art for the imposition of a negative potential to an electrical conductor.

In the process of blood oxygenation not only does the blood gain oxygen by the permeation thereof through the membranes defining passageways $a$, but at the same time carbon dioxide leaves the blood through these same membranes passing in the opposite direction. As is indicated in the aforementioned Dibelius et al. patent application, blood has been effectively oxygenated in devices similar to the cross-flow blood oxygenator described herein at rates of flow as high as 100 milliliters of blood per minute.

While oxygenation of blood has been disclosed as a specific example, it is obvious that gases other than oxygen may be introduced across such non-porous membranes into a blood stream as, for example, in the administering of anesthetics.

The improvement proposed herein, is not an application of the well-known blood cleansing method known as "electrodialysis" wherein porous membranes and electrical treatment are employed. In electrodialysis the phenomenon of selective permeability is not, and cannot be, employed while it is an essential element of the operation in the instant invention. Further, the electrical treatment employed in electrodialysis is employed specifically to urge the separation of solid impurities from the blood stream, while in the instant improvement electrical treatment is relied upon solely to minimize, or obviate, contact between the red blood cells and the separators from the membranes in the blood flow passages.

What I claim as new and desire to secure by Letters Patent of the United States is:

1. In an apparatus for effecting the exchange of gas to and/or from flowing blood wherein a plurality of imperforate electrically non-conducting polymeric membranes are assembled in substantially parallel stacked relationship between rigid walls to define a plurality of passageways arranged into two separate sets with appropriate manifolding for conducting gas flow through the first set of said passageways and blood flow through the second set of said passageways, each blood flow being conducted between a pair of gas flows and being separated from each gas flow by one of said membranes and foraminous means are disposed in each of said passageways, the improvement in said combination comprising:
    (a) the foraminous means located in the second set of passageways being electrically conductive and
    (b) means electrically connected to said electrically conductive foraminous means for imposing a predetermined negative potential thereto.

2. The improvement substantially as recited in claim 1 wherein the predetermined negative potential is supplied by a battery in series with a potentiometer, the adjustable contact to the potentiometer being connected to each foraminous means located in the second set of passageways and the positive terminal of the battery being connected to ground.

3. In a process for effecting the exchange of gas to and/or from flowing blood outside the body wherein the flow of blood is conducted through at least one channel having a high area-to-volume ratio defined over the major boundaries thereof by thin, permeable, non-porous polymer membranes and gas is flowed over the opposite side of each membrane, the improvement comprising the steps of:
    (a) introducing an electrically conducting foraminous spacer into said channel and
    (b) passing a flow of blood through said channel while
    (c) applying a negative potential to said spacer.

References Cited

UNITED STATES PATENTS

| | | | |
|---|---|---|---|
| 3,060,934 | 10/1962 | Claff et al. | 23—258.5 |
| 3,266,629 | 8/1966 | Megibow | 210—321 |
| 3,398,091 | 8/1968 | Greatorex | 210—321 XR |
| 2,792,002 | 5/1957 | Malmros et al. | 23—258.5 |
| 3,413,095 | 11/1968 | Bramson | 23—258.5 |

OTHER REFERENCES

Mirkovitch, Velimir; Cleveland Clinic Quarterly, vol. 30, Oct. 1963 (pp. 241–252 relied on).

Mustard, W. T., et al.; Surgery: November 1952; vol. 32, No. 5 (pp. 803–810 relied on).

MORRIS O. WOLK, Primary Examiner

B. S. RICHMAN, Assistant Examiner

U.S. Cl. X.R.

23—258.5